United States Patent [19]

Yamakoshi et al.

[11] Patent Number: 4,968,014

[45] Date of Patent: Nov. 6, 1990

[54] SHEET TRANSPORT APPARATUS FEEDING TO A PLURALITY OF TRAYS IN ACCORDANCE WITH THE SHEET SIZE OF THE TRANSPORTED MEDIA

[75] Inventors: Yukiyoshi Yamakoshi; Hiroyuki Makiyama, both of Osaka, Japan

[73] Assignee: Minolta Camera Kabushiki Kaisha, Osaka, Japan

[21] Appl. No.: 489,729

[22] Filed: Feb. 28, 1990

Related U.S. Application Data

[63] Continuation-in-part of Ser. No. 234,943, Aug. 22, 1988, abandoned.

[30] Foreign Application Priority Data

Aug. 21, 1987 [JP] Japan .................. 62-208759

[51] Int. Cl.$^5$ .............................. B65H 5/22
[52] U.S. Cl. .................... 271/3.1; 271/176; 271/298; 271/303; 355/28; 198/447; 209/933; 83/106; 83/94
[58] Field of Search ............. 271/3.1, 298, 176, 303, 271/301; 83/106, 94; 209/933, 942, 941, 698, 586; 355/27-29; 198/447

[56] References Cited

U.S. PATENT DOCUMENTS

| | | | |
|---|---|---|---|
| 2,636,603 | 4/1953 | Feick et al. | 209/941 X |
| 2,695,098 | 11/1954 | Rendel | 209/586 X |
| 3,038,604 | 6/1962 | Muller | 209/586 X |
| 3,138,047 | 6/1964 | Sennello | 83/106 |
| 3,717,249 | 2/1973 | Faley | 271/176 X |
| 4,272,180 | 6/1981 | Satomi et al. | 271/3.1 X |
| 4,534,643 | 8/1985 | Watanabe | 271/303 X |
| 4,601,570 | 7/1986 | Bartz et al. | 355/27 |
| 4,702,589 | 10/1987 | Ito | 355/14 SH |
| 4,743,945 | 5/1988 | Ito et al. | 355/14 SH |

FOREIGN PATENT DOCUMENTS 53-98833 8/1978 Japan .
62-116464 5/1987 Japan .

Primary Examiner—Andres Kashnikow
Assistant Examiner—Kenneth DeRosa
Attorney, Agent, or Firm—Wenderoth, Lind & Ponack

[57] ABSTRACT

A transport apparatus for transporting media in various size sheets processed at a first processing station to a second processing station. The apparatus comprises, as main components thereof, a plurality of trays disposed between the first and second processing stations, each for accommodating media sheets of one size stacked one upon another, a first transport device for receiving media from the first processing station and transporting the media to the trays, and a second transport device associated with the trays for successively transporting the media from the trays to the second processing station.

18 Claims, 5 Drawing Sheets

SHEET TRANSPORT APPARATUS FEEDING TO A PLURALITY OF TRAYS IN ACCORDANCE WITH THE SHEET SIZE OF THE TRANSPORTED MEDIA

This application is a continuation-in-part of now abandoned application, Ser. No. 07/234,943 filed on Aug. 22, 1988.

BACKGROUND OF THE INVENTION

(1) Field of the Invention

The present invention relates to a transport apparatus for feeding media in sheets of various sizes from a first processing station to a second processing station.

(2) Description of the Prior Art

One example of the above transport apparatus is an image-forming apparatus in which the first processing station is an exposure station and the second processing station a developing station. In the image-forming apparatus, a photosensitive recording film is exposed to light at the exposure station for forming an image thereon, and the image-carrying film is transported to the developing station for developing the image into a visible image.

Known image-forming apparatus generally include only a plurality of transport rollers between the exposure station and the developing station. Accordingly, there is no problem unless the processing speed (film transport speed) V1 at the exposure station is higher than the processing speed (film transport speed) V2 at the developing station. If the processing speed V1 is maintained higher than the processing speed V2, the recording film will accumulate upon a transport path between the exposure station and the developing station in an amount corresponding to a difference (V1−V2) per unit time between the two processing speeds. In such a case, therefore, the processing at the exposure station must be adjusted to the transport speed at the developing station, such as by controlling the exposure station to wait for completion of the processing at the developing station and transporting a next sheet of film from the exposure station to the developing station only after the processing is completed at the developing station.

It is conceivable as a solution to the above problem to provide a film-storing tray T between the exposure station and developing station so that the processing at the exposure station need not be adjusted to the transport speed at the developing station. However, where the film is in sheets of various sizes, the sheets of film S1 are stacked on the tray T with leading ends thereof placed out of register. This state makes it difficult for the sheets of film S1 to be picked up and sent out of the tray T reliably.

SUMMARY OF THE INVENTION

A primary object of the present invention, therefore is to provide a sheet transport apparatus comprising a first processing station (exposure station) and a second processing (developing station) capable of processing sheets at their own processing speeds, even when the processing speed of the first processing station is higher than that of the second processing station.

Another object of the present invention is to provide a sheet transport apparatus capable of feeding sheets smoothly to the second processing station.

Still another object of the present invention is to provide a sheet transport apparatus in which sheets are processed in the first processing station and the second processing station and then delivered in the same order in order to avoid confusing the operator.

These objects are fulfilled, according to the present invention, by a transport apparatus for transporting media in various size sheets from a first processing station to a second processing station comprising a plurality of trays disposed between the first processing station and the second processing station, each for accommodating media of one sheet size stacked one upon another. A first transport arrangement receives the media from the first processing station and transports the media to the trays, the first transport arrangement including a guide for selecting one of the trays in accordance with the sheet size of the media and guiding the media to the selected trays. Memory means stores the order in which the media are processed in the first processing station. A second transport arrangement is associated with the respective trays, for successively transporting the media from the trays to the second processing station.

The objects of the invention are fulfilled also by a transport apparatus for transporting media in various sized sheets from a first processing station to a second processing station after the media are exposed at the first processing station to form images thereon. A plurality of trays are disposed between the first processing station and the second processing station, corresponding to the different sizes of the media, each of the trays being provided for accommodating the media stacked one upon another therein. A first transport arrangement transports the media exposed at the first processing station from the first processing station to the trays. A switch is disposed on a transport path defined by the first transport arrangement for switching transport directions of the first transport arrangement so that the media are selectively transported to the trays in accordance with their size. Memory means stores the order in which the media are processed in the first processing station associated with the respective trays, for successively transporting the media from the trays to the second processing station.

Furthermore, the objects of the invention are fulfilled by a transport apparatus for use in an image-forming system in which media in various sized sheets are exposed at an exposure station to form images thereon, and thereafter the images are developed at a developing station whose processing speed is slower than a processing speed at the exposure station, the transport apparatus comprising a plurality of trays disposed between the exposure station and the developing station and having different sizes corresponding to different sizes of the media, each of the trays being provided for accommodating the media stacked one upon another therein. A first transport arrangement successively transports the media formed with images thereon at the exposure station to the trays, the first transport arrangement includes a switch for switching transport paths so that the media are selectively transported to the trays in accordance with their size. Memory means stores the order in which the media are exposed at the exposure station. A plurality of second transport devices are associated with the trays, respectively, for successively transporting the media from the trays to the developing station, the second transport devices being selectively operable to send the media out of the trays in the order in which the media are transported by the first transport arrangement.

In sum, the objects of the invention are fulfilled by providing a plurality of trays between the first and second processing stations, to correspond to sheet sizes of the media. Different size sheets are selectively stored on the trays, the order in which the sheets have been processed in the first processing station is stored, and the sheets are transported to the second processing station through the second transport means in the stored order.

BRIEF DESCRIPTION OF THE DRAWINGS

The above and other objects, advantages and features of the invention will become apparent from the following description taken in conjunction with the accompanying drawings which illustrate a specific embodiment of the invention. In the drawings.

DESCRIPTION OF THE PREFERRED EMBODIMENT

Figure 1:
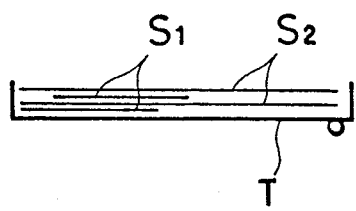
FIG. 1 is a view illustrating how sheets of various sizes are stored on a sheet tray according to the prior art.
Figure 2:
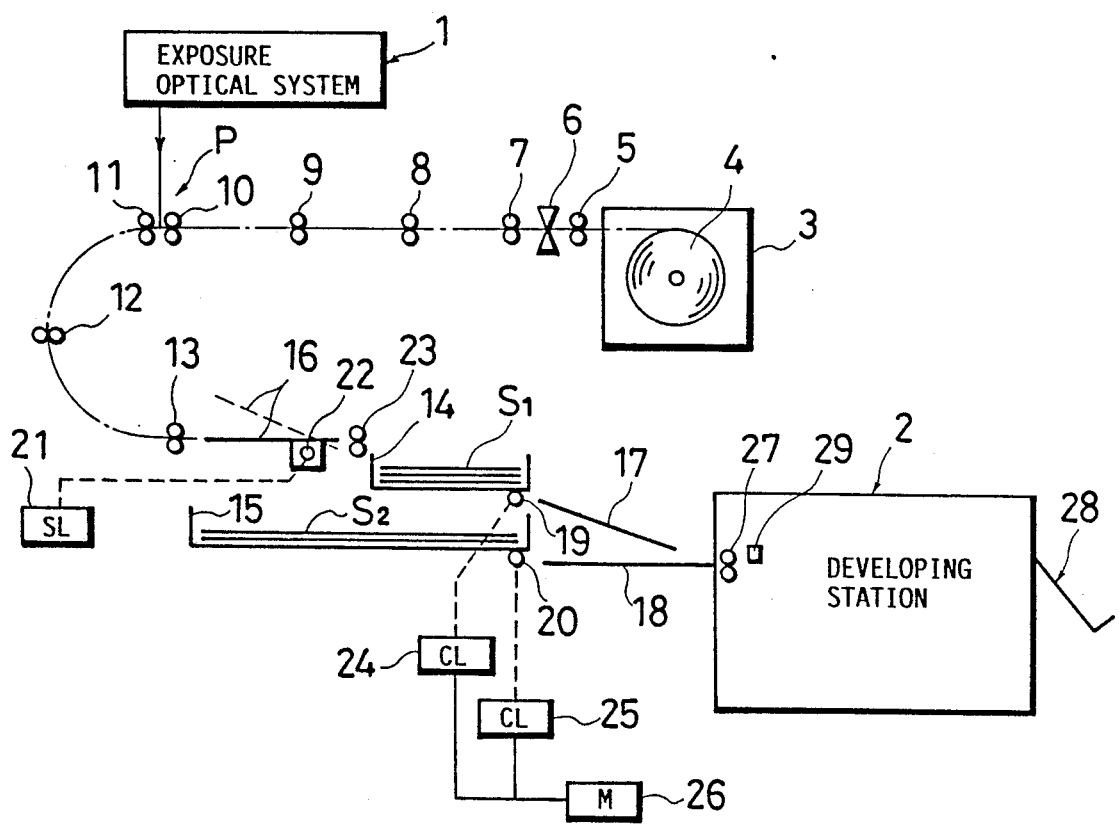
FIG. 2 is a schematic view illustrating an image forming apparatus in which a sheet transport apparatus embodying the present invention is applied.

Referring to FIG. 2, an image-forming apparatus employing a sheet transport apparatus embodying the present invention comprises an exposure optical system 1, a second processing station or developing station 2, and a magazine 3 housing a rolled recording film 4 removably mounted in the illustrated position. The rolled recording film 4 in the magazine 3 is a photosensitive film such as a silver salt film, which is pulled out of the magazine 3 by a feed roller pair 5. A transport path extending from the feed roller pair 5 to an exposure station P of the exposure optical system 1 includes a cutter 6 for cutting the recording film to selected sizes, and a plurality of transport roller pairs 7, 8 and 9. The exposure station P includes transport roller pairs 10 and 11 for nipping and transporting at a fixed speed the recording film delivered by the transport roller pair 9. The exposure optical system 1 directs a laser beam to the recording film lying between the two transport roller pairs 10 and 11, to thereby form an image on the recording film.

The exposure optical system 1 modulates the laser beam in response to an image signal, and line-scans the recording film by causing the modulated laser beam to sweep the film in a direction perpendicular to a film transport direction. This optical system 1 has a construction well-known in the art, and its description is omitted here.

A transport path extending from the exposure station P to the developing station 2 includes transport roller pairs 12 and 13, a plurality of trays 14 and 15 for storing sheets of the recording film in stacks, a path switching lever 16 for selectively delivering the sheets to the trays 14 and 15 according to sheet sizes S1 and S2, and pickup rollers 19 and 20 for sending the sheets out of the trays 14 and 15 onto guides 17 and 18 extending to the developing station 2.

The plurality of trays 14 and 15 have different sizes corresponding to the sizes to which the recording film is cut by the cutter 6. In this embodiment, the cutter 6 cuts the recording film to B5 and B4 sizes and so two types of trays 14 and 15 are provided, i.e. the tray 14 for storing B5 size sheets S1 of the recording film and the tray 15 for storing B4 size sheets S2.

The path switching lever 16 is pivotable about a point 22 by electrifying and de-electrifying a rotary solenoid 21. When the rotary solenoid 21 is electrified to place the switching lever 16 in a horizontal posture as shown in a solid line in FIG. 2, the sheets of recording film are guided onto a top surface of the switching lever 16 and delivered to the tray 14 via the transport roller pair 23. When the switching lever 16 has pivoted to an inclined posture as shown in a broken line, the sheets pass under the switching lever 16 to be delivered directly to the tray 15.

The pickup rollers 19 and 20 contact the lowermost sheets on the trays 14 and 15, respectively, for sending out one sheet after another. Each pickup roller 19 or 20 is connected to a motor 26 through a clutch 24 or 25. Drive of the motor 26 is transmitted to each roller 19 or 20 when the clutch 24 or 25 is engaged.

Number 27 in FIG. 2 indicates a roller pair for receiving the sheets of film from the guides 17 and 18 and feeding the sheets into the developing station 2. Number 28 indicates a tray for receiving the sheets discharged from the developing station 2. Number 29 indicates a sensor which is to be turned on when a sheet is transported in the vicinity of the roller pair 27.

The developing station 2 receives the sheets from the roller pair 27 and advances the sheets therethrough. During the passage through the developing station 2, the sheets of recording film are subjected to various processes such as a developing process and a fixing process, whereby the images on the sheets become visible images. Details of the developing station 2 are well-known and are, therefore, not described herein.

Figure 3:
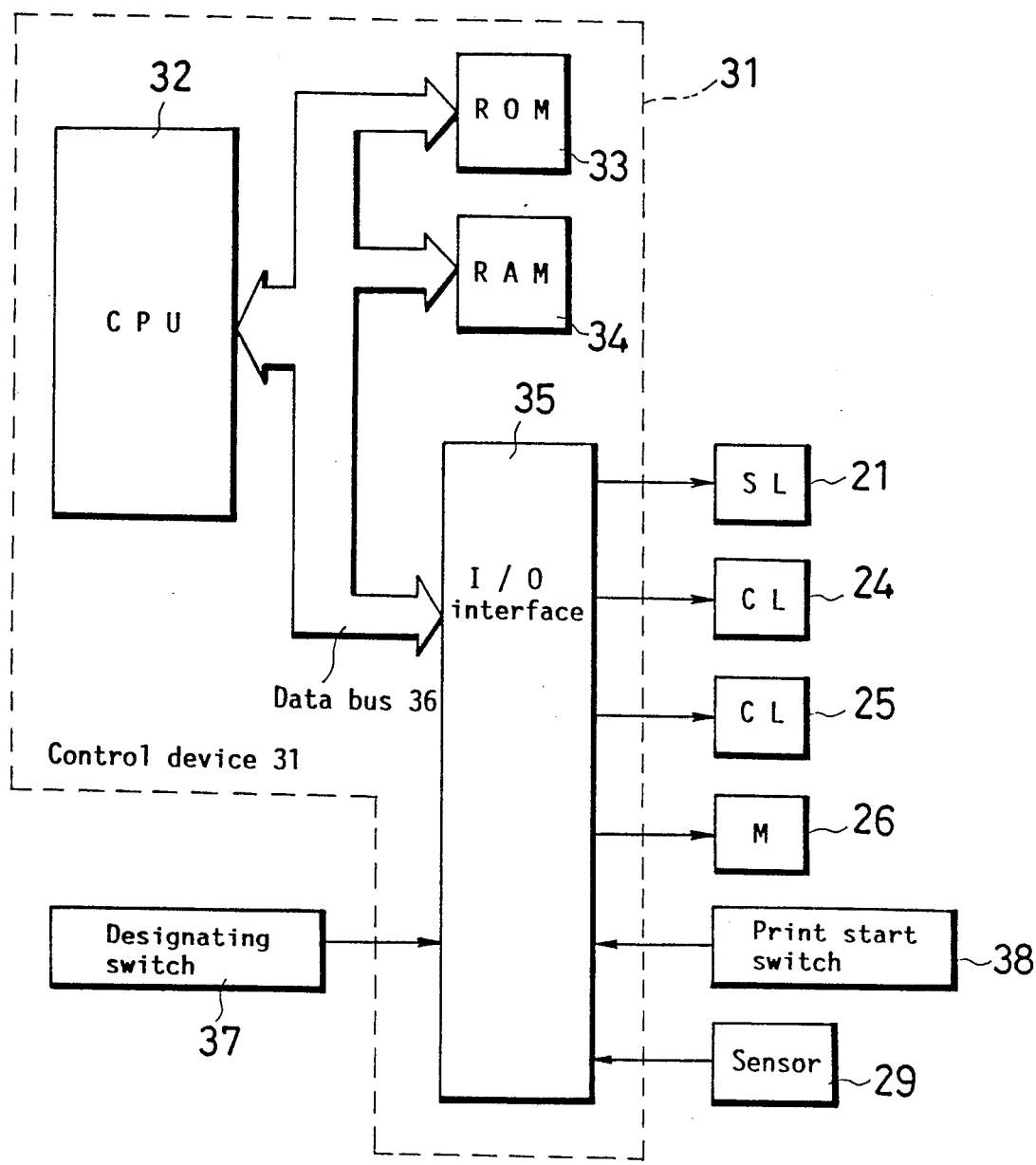
FIG. 3 is a block diagram of a control device 31 of the same.

The rotary solenoid 21, the clutches 24 and 25, and the motor 26 are operated by a control device 31 shown in FIG. 3. The control device 31 comprises a CPU 32 capable of multi-task processing such as time sharing or interruption, a ROM 33 for storing processing programs for the CPU 32, a RAM 34 to be used as a work area for the processing executed by the CPU 32, and an I/O interface 35 for interfacing the control device 31 and the rotary solenoid 21, the clutches 24 and 25, the motor 26, a designating switch 37 for designating a copy number and a size of the sheet, a print start switch 38 and the sensor 29. The CPU 32, the ROM 33, the RAM 34 and the I/O interface 35 are connected with one another by a data bus 36.

Figure 4:
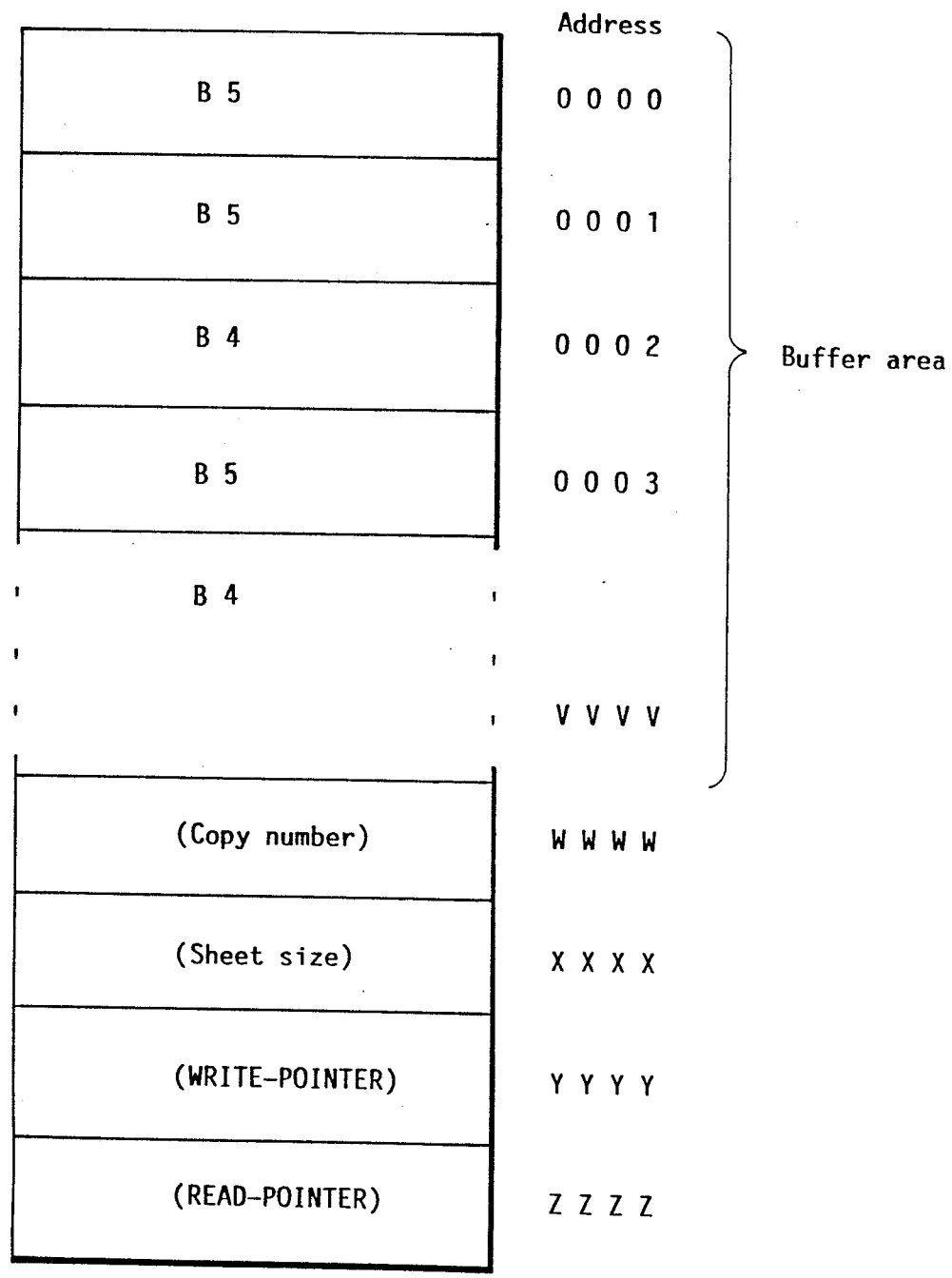
FIG. 4 is a memory map of a RAM 34 of the same.

FIG. 4 exemplifies a memory map of the RAM 34. Addresses 0000 to VVVV are used as a buffer area for storing sizes of the sheets S1, S2, . . . in the order of which the sheets have been processed by the exposure station P. An address WWWW is a memory area of a copy number and another address XXXX is a memory area for storing the size of the sheets which are being processed at the exposure station P. An address YYYY is a WRITE-POINTER for indicating in which address the size of the sheets is to be written and an address ZZZZ is a READ-POINTER for indicating from which address the size of the sheets is to be read.

Figure 5:
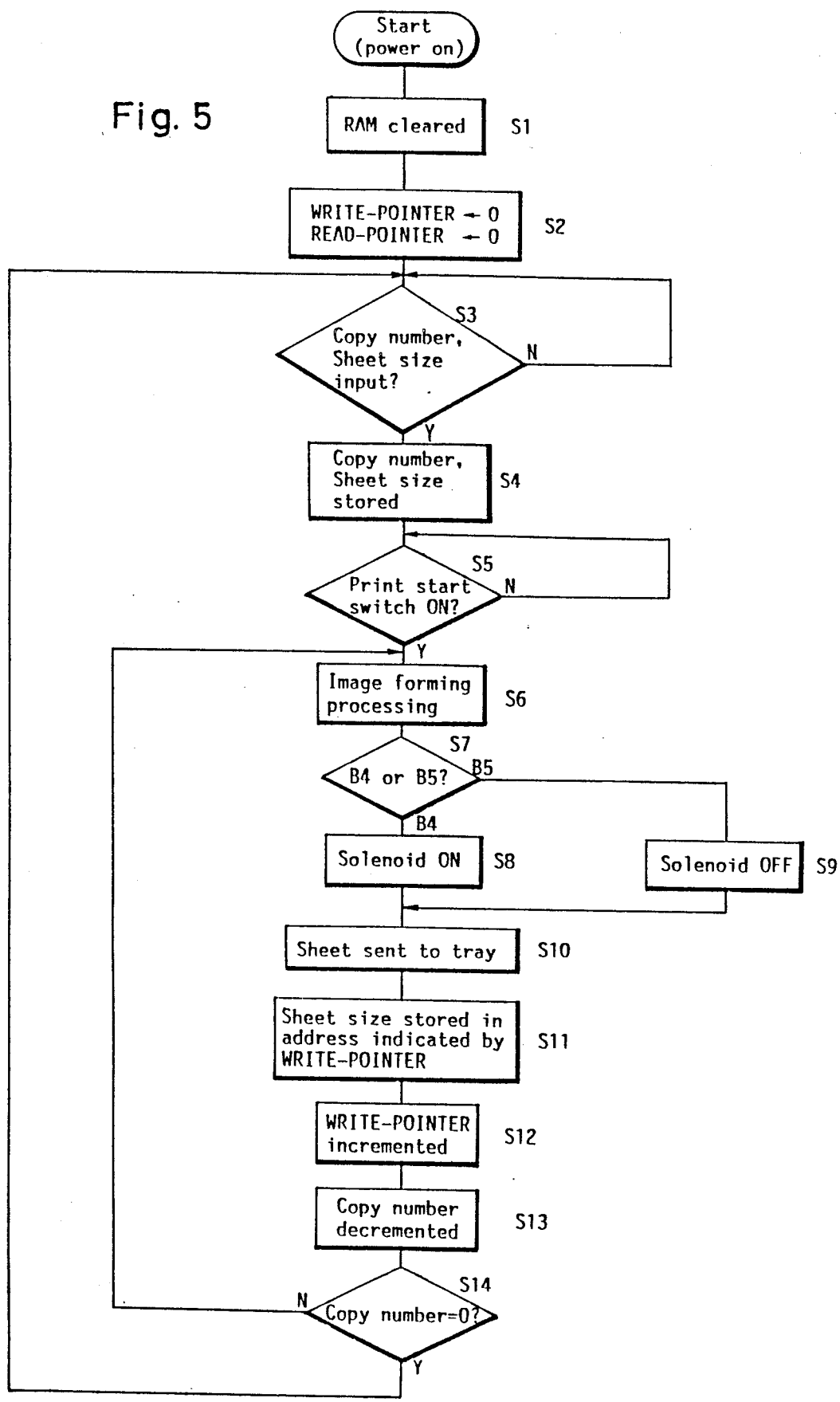
FIGS. 5 and 6 are flowcharts showing processing of the control device 31.

A first main routine and a second main routine of the image forming apparatus will be described referring to FIGS. 5 and 6.

(First main routine)

When the power is turned on, the contents of the buffer area in the RAM 34 are cleared (S1), and the READ-POINTER and the WRITE-POINTER are reset (S2). If the magazine 3 is mounted at a specified position at this time, a forward end of the rolled recording film 4 is engaged into the roller pair 4, whereby the image forming apparatus is ready for a printing sequence. A copy number and a size of the sheets of the recording film 4 are input by the switch 37 (S3) and are stored in the addresses WWWW and XXXX, respectively, of the RAM 34 (S4). Then, print start is commanded by the switch 38 (S5).

Upon receiving the above command, the operation goes to S6 for image forming processing. The roller pair 5 rotate to pull out the rolled recording film 4 by a length corresponding to the above-input size, and the cutter 6 cuts the film 4 into a sheet having the above length. The sheet is transported by the roller pairs 7, 8 and 9 to the exposure station P. When nipped by the roller pairs 10 and 11 at the exposure station P, the sheet is exposed to a beam modulated by the optical system 1 in response to an image signal provided by a host computer (not shown), whereby an image is formed on the sheet. After that, the sheet is transported by the roller pairs 11, 12 and 13 to a position just short of the path switching lever 16.

Whether the size of the sheet stored in the address XXXX is B4 or B5 is judged (S7). If the size is judged B4, the rotary solenoid 21 is turned on (S8) and if the size is judged B5, the rotary solenoid 21 is turned off (S9), in accordance with which the path switching lever 16 is switched. Then, the sheet is transported into the tray corresponding to its size (the tray 14 for B5 and the tray 15 for B4) and stocked therein (S10). The above sheet size is stored in the address indicated by the WRITE-POINTER (S11) and the WRITE-POINTER is incremented (S12). Also executed at this time is other processing such as resetting the WRITE-POINTER if its value exceeds VVVV and controlling the buffer area to reject storing any other data if the whole buffer area is full of valid sheet sizes. Then, the copy number is decremented (S13), and whether the copy number is 0 or not is judged (S14). If not, the operation from S6 through S14 is repeated. If so in S14, the operation from S3 through S14 is repeated.

In this way, images are formed on the sheets one after another and the sheets are accommodated in the tray 14 and 15 while the sizes of the sheets are stored in the RAM 34 in the order in which the sheets have had the images formed thereon.

(Second main routine)

Figure 6:
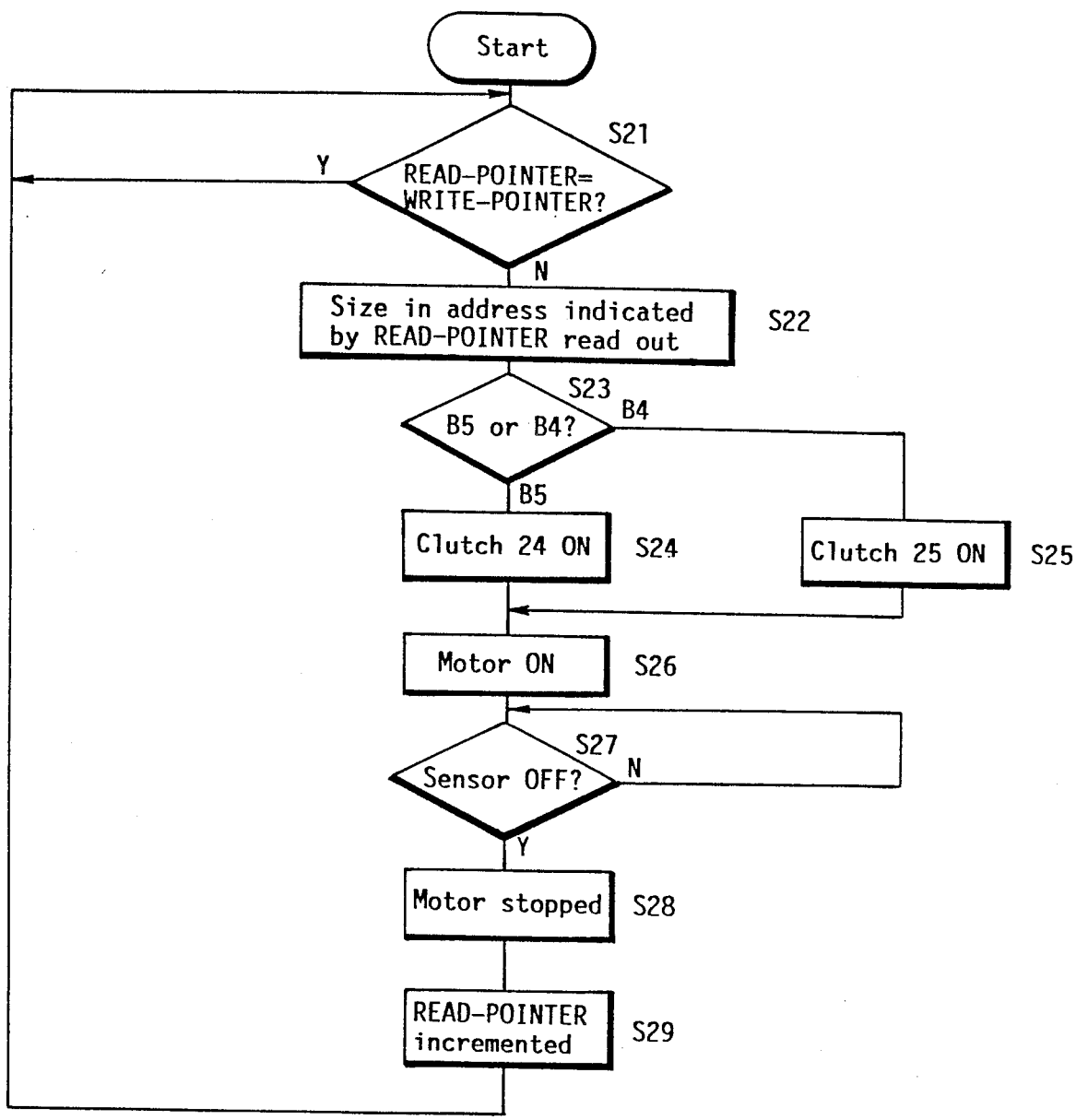

The second main routine in FIG. 6 is executed in parallel with the first main routine. The second main routine may be an interruption routine which starts every time the developing station 2 is ready for development.

Whether the values of the READ-POINTER and the WRITE-POINTER are equal or not, namely, whether the sheets to be fed to the developing station 2 are accommodated in the tray 14 or 15 or not, is judged (S21). If equal, namely, if neither tray accommodates the sheets, the judgement is repeated. If not equal in S21, the sheet size stored in the address indicated by the READ-POINTER is read out (S22) and whether that size is B5 or B4 is judged (S23). If B5, the clutch is turned on (S24) and if B4, the clutch 25 is turned on (S25), thereafter the motor 26 is turned on (S26). This rotates the pickup roller 19 or 20, whereby the sheets accommodated in the tray 14 or 15 are transported, from bottom to top, to the developing station 2 in the order in which the sheets have had the images formed thereon. Whether the sensor 29 is turned off or not is judged (S27). If so, namely, if all the sheets have been transported to the developing station 2, the motor 26 is stopped (S28) and the READ-POINTER is incremented (S29). At this time, the READ-POINTER is reset if its value exceeds VVVV. After that, the operation from S21 through S29 is repeated. If the sensor 29 is not off in S27, the judgement is repeated.

Each sheet which has been transported to the developing station 2 has its image developed there and is delivered to the tray 28.

A sheet transport speed from the magazine 3 to the tray 14 or 15, namely a processing speed through the exposure status P of the apparatus, is faster than a sheet transport speed through the developing station 2, namely a processing speed of the developing station 2. Therefore, when a multiplicity of images are recorded successively on plural sheets of the recording film, even if image-carrying sheets accumulate on the trays 14 and 15, the sheets are fed from the trays 14 and 15 through the guides 17 and 18 and delivery roller pair 27 into the developing station 2 in the order of image forming. The order of printing is stored in a memory, not shown, and the clutches 24 and 25 are selectively operated in response to a signal from the memory. The images are developed at the developing station 2, and then the sheets are discharged onto the tray 28. Although not shown, a sheet sensor is provided adjacent the roller pair 27 which deliver the sheet to the developing station 2. This sensor detects a start and an end of sheet nipping by the roller pair 27. The clutches 24 and 25 are operable under timing control by means of a detection signal resulting from the end of sheet nipping.

While two trays are provided upstream of the developing station in the described embodiment, three or more trays may be provided to accommodate any selected sheet sizes of the recording film. Sheets having different widths as well as different lengths may also be employed. In such case, the sheets may be aligned on the basis of their center line or a side line thereof. Further, one tray may be used for sheets having slightly different sizes.

The invention has been described as a sheet transport apparatus applied to an image-forming apparatus. However, it is of course possible to apply the invention to other types of sheet processing machine such as a machine for labeling sheets and a machine for forming cutouts in sheets.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A transport apparatus for transporting media in various size sheets from a first processing station to a second processing station, comprising:
   a plurality of trays for disposition between the first processing station and the second processing station, each said tray adapted to accommodate media stacked therein of one sheet size;
   first transport means for receiving media from the first processing station, transporting the media to said plurality of trays, selecting one of said trays in accordance with the sheet size of the media, and guiding the media to said one of said trays;
   memory means for storing the order in which the media are processed in the first processing station; and
   second transport means for successively transporting the media from said trays to the second processing station in the order stored in said memory means.

2. A transport apparatus as claimed in claim 1, wherein said media are sheets of photosensitive film.

3. A transport apparatus as claimed in claim 1, wherein said first transport means comprises a path switching lever pivotable about a pivot point for switching a transport path of the media to select one of said plurality of trays.

4. A transport apparatus as claimed in claim 3, wherein said first transport means further comprises a rotary solenoid for pivotable control of said path switching lever by electrifying and de-electrifying said rotary solenoid.

5. A transport apparatus as claimed in claim 1, wherein said second transport means comprises:
   a plurality of pickup rollers, at least one pickup roller for each said tray, for contacting a leading end of a lowermost media sheet in each said tray.

6. A transport apparatus as set forth in claim 5, wherein:
   said plurality of pickup rollers are connected to a plurality of clutch mechanisms, and said plurality of clutch mechanisms are connected to a motor.

7. A transport apparatus for transport media in various size sheets from a first processing station to a second processing station after the media have been exposed to form images thereon at the first processing station, comprising:
   a plurality of trays for disposition between the first processing station and the second processing station and corresponding to different sizes of media, each said tray adapted to accommodate media stacked therein;
   a first transport means for transporting exposed media from the first processing station to said plurality of trays and defining a transport path;
   switch means disposed along said transport path for switching the transport direction of said first transport means to selectively transport media to said plurality of trays in accordance with the size of the media;
   memory means for storing the order in which the media are processed in the first processing station; and
   second transport means for successively transporting the media from said trays to the second processing station in the order stored in said memory means.

8. A transporting apparatus for transporting media in various size sheets from a first processing station to a second processing station as set forth in claim 7, wherein said media are sheets of photosensitive film.

9. A transport apparatus as set forth in claim 7, wherein said switch means comprises a path switching lever pivotable about a pivot point.

10. A transport apparatus as set forth in claim 9, wherein said switch means further comprises a rotary solenoid for pivotable control of said path switching lever by electrifying and de-electrifying said rotary solenoid.

11. A transport apparatus as set forth in claim 7, wherein said second transport means comprises a plurality of pickup rollers, at least one pickup roller for each said tray, for contacting a leading end of a lowermost media sheet in each said tray.

12. A transport apparatus as set forth in claim 11, wherein said plurality of pickup rollers are connected to a plurality of clutch mechanisms, and said plurality of clutch mechanisms are connected to a motor.

13. A transport apparatus for use in an image-forming system in which media in various sizes of sheets are exposed at an exposure station to form images thereon and then developed at a developing station, the developing station having a processing speed slower than a processing speed of the exposure station, said transport apparatus comprising:
   a plurality of trays for disposition between the exposure station and the developing station having different sizes corresponding to the various sizes of media to be transported, each said tray adapted to accommodate media stacked therein;
   a first transport means for successively transporting the media with images formed thereon at the exposure station to said plurality of trays along a transport path and selectively switching said transport path in accordance with the size of media being transported between said plurality of trays;
   memory means for storing the order in which media are exposed at the exposure station; and
   a plurality of selectively operable second transport means corresponding to said plurality of trays, respectively for successively transporting media from said plurality of trays to the developing station in the order stored in said memory means.

14. A transport apparatus as set forth in claim 13, wherein said media are sheets of photosensitive film.

15. A transport apparatus as set forth in claim 13, wherein said switch means comprises a path switching lever pivotable about a pivot point.

16. A transport apparatus as set forth in claim 15, wherein said switch means further comprises a rotary solenoid for pivotable control of said path switching lever by electrifying and de-electrifying said rotary solenoid.

17. A transport apparatus as set forth in claim 13, wherein said second transport means comprises a plurality of pickup rollers, at least one pickup roller for each said tray, for contacting a leading end of a lowermost media sheet in each said tray.

18. A transport apparatus as set forth in claim 17, wherein said plurality of pickup rollers are connected to a plurality of clutch mechanisms, and said plurality of clutch mechanisms are connected to a motor.

* * * * *